United States Patent
Eberly, Jr.

[15] 3,665,061
[45] May 23, 1972

[54] PROCESS FOR PRODUCING COLLAGEN SPONGES

[72] Inventor: David H. Eberly, Jr., Fairfield, Conn.
[73] Assignee: United States Banknote Corporation, New York, N.Y.
[22] Filed: July 16, 1969
[21] Appl. No.: 842,251

[52] U.S. Cl. ..................................264/49, 18/45, 18/14 A, 106/124, 131/10 R, 131/140 P, 264/101, 264/140, 264/177
[51] Int. Cl. .....................A24c 5/48, B29d 27/06, C08h 7/06
[58] Field of Search ............264/41, 49, 28, 140, 101, 177 R; 106/122, 124, 123; 260/2.5 M; 131/10.9, 10 R, 140 P; 18/45, 14 A

[56] References Cited

UNITED STATES PATENTS

| 2,166,074 | 7/1939 | Reichel | 106/122 UX |
|---|---|---|---|
| 2,307,371 | 1/1943 | Hileman | 264/28 |
| 2,411,152 | 11/1946 | Folsom | 264/28 X |
| 2,610,625 | 9/1952 | Sifferd et al. | 106/122 X |
| 2,838,363 | 6/1958 | Veis et al. | 264/28 X |
| 2,883,990 | 4/1959 | Nichols | 131/10.9 |
| 3,136,682 | 6/1964 | Tu | 264/28 X |
| 3,157,524 | 11/1964 | Artandi | 106/122 |
| 3,429,768 | 2/1969 | Young | 106/122 X |
| 2,648,262 | 8/1953 | Croston et al. | 264/109 UX |
| 3,151,095 | 9/1964 | Stone et al. | 264/28 UX |
| 3,223,090 | 12/1965 | Strubel et al. | 131/140 P UX |
| 3,368,911 | 2/1968 | Kuntz et al. | 131/140 P UX |
| 3,551,535 | 12/1970 | Henderson et al. | 106/124 X |

FOREIGN PATENTS OR APPLICATIONS 706,027    5/1941    Germany ..............................264/41

OTHER PUBLICATIONS

Kirk–Othmer Encyclopedia of Chemical Technology, pp. 303–306, 334, 335, Second Completely Revised Edition, Vol. 12, New York, Interscience; C. 1967
Woodward, H. Teynham "A Major Breakthrough Freeze Dehydration Without Vacuum," Part I, In Meat, July 1963, pp. 34, 35, 37, 57

Primary Examiner—Philip E. Anderson
Attorney—Cushman, Darby & Cushman

[57] ABSTRACT

A method for producing a spongy mass of compacted collagen particles having a large surface area to volume ratio and suitable for use in filtering materials such as tobacco smoke. To form the spongy mass, finely granulated collagen particles are mixed with snow, frozen carbon dioxide or similar material, and the mixture chopped and mixed at temperatures below the freezing point to cause entwining of the distal fibers and impart binding. The mixture is then compacted and forced through a forming tube having a gradually decreasing diameter and porous walls through which the supporting snow or carbon dioxide matrix is removed. A compacted tube or rod of collagen sponge suitable for filtering cigarette or tobacco smoke merges from the forming tube and can be cut or otherwise treated as desired.

9 Claims, 1 Drawing Figure

Patented May 23, 1972
3,665,061
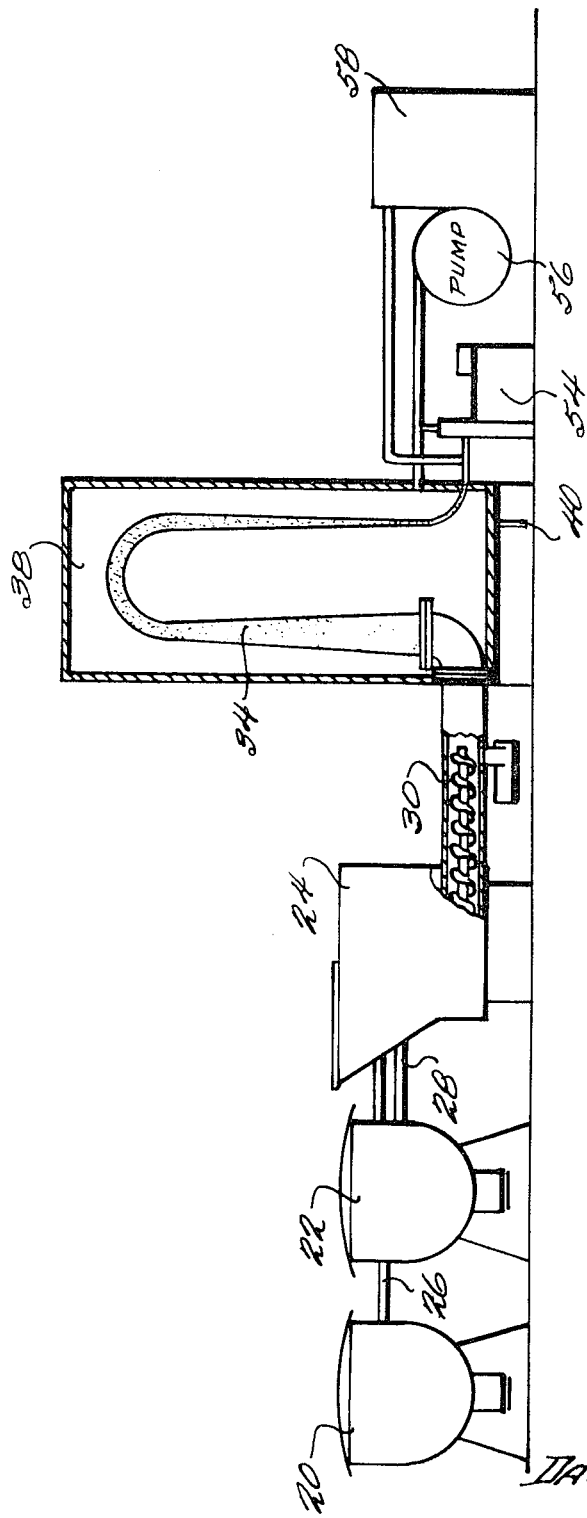
INVENTOR
DAVID H. EBERLY, JR.
BY
Cushman, Darby & Cushman
ATTORNEYS

PROCESS FOR PRODUCING COLLAGEN SPONGES

A BRIEF DESCRIPTION OF THE PRIOR ART AND SUMMARY OF THE INVENTION

This invention relates to a method for preparing a collagen sponge mass particularly useful in filtering tobacco smoke.

Collagen and other similar protein material has been shown in the past to make an excellent filter for removing undesirable and dangerous substances from tobacco smoke and other materials. A collagen or other protein filter is particularly effective in filtering when the collagen is in the form of finely ground particles or otherwise arranged so as to present a large surface area to volume ratio to a stream of smoke or other material which is to be filtered, and such filters are discussed in detail in an application filed Sept. 13, 1968 entitled PROTEIN FILTER AND METHOD OF PRODUCING PROTEIN PARTICLES, Ser. No. 759,699 and assigned to the assignee of the present application and now abandoned. Particulate protein filters are further advantageous in that satisfactory filtering can be achieved while maintaining free flow of the filtered material through the filter. This is particularly important in cigarette filters where the smoke must draw easily through the filter.

The present invention relates to a method for producing spongy masses of collagen or similar protein material from such finely ground collagen particles which not only possess a large surface area to volume ratio so as to be especially effective in filtering, but also are reasonably compact and solid.

Spongy masses of naturally occurring collagen fibers have in the past been made for use as surgical sponges and other structures. The usual method of preparing such a sponge is simply to mix the collagen fibers in a water slurry in which the fibers separate and become entwined usually with the aid of additional binding chemicals in the slurry. The moisture in the slurry is then removed, for example, by freeze drying or the like, leaving a dry solid mass of intertwined fibers. The patents to Artandi, U.S. Pat. Nos. 3,157,524; Tu, 3,071,483 and Skokie, 3,297,459 are exemplary of prior art techniques.

However, previously known techniques are unsatisfactory in producing a spongy mass of collagen particles. While adequate structural integrity, surface area to volume ratio and density can be achieved by adding fine collagen particles to a slurry containing 92–97 percent water and preferably soluble gelatin to further improve binding, removing the water from the slurry without harming the temperature sensitive collagen is impractically expensive. By the improved process and apparatus of this invention snow, frozen carbon dioxide or a similar crystalline material is added to finely ground particulate collagen, instead of water, as the means of dispersing and entwining the particles into a spongy mass suitable for filtering. This mixture of protein particles and snow is then mixed and chopped, dispersing and entwining the particles in the same way as in a water slurry. When the mixture has achieved a suitable bulk density and the desired degree of entwining, the crystalline supporting matrix of snow, carbon dioxide or the like is removed by vacuum drying or a similar process leaving a spongy mass which can then form a cigarette or other filter.

The particular apparatus for accomplishing these steps as described below includes mixers which mix the protein particles and show or like material and provide a mixture which is automatically or manually fed to a hopper which leads to a worm compacter which compacts and then forces the mixture into a porous, forming tube having a gradually decreasing diameter. As the mixture moves through the tube, which preferably is lined with Teflon or similar material, a conventional pump or other vacuum system disposed about the tube removes the supporting crystalline matrix as a gas, leaving a spongy, compacted mass. This compacted collagen mass then continuously emerges from the forming tube as a solid rod having excellent structural integrity and at the same time a spongy interior with the very high volume to surface area ratio desirable for filtering.

Many other objects and purposes of the invention will become clear after reading the following detailed description of the drawings.

BRIEF DESCRIPTION OF THE DRAWINGS

FIG. 1 shows an apparatus for carrying out the method of this invention for forming a spongy mass of collagen or other protein particles.

DETAILED DESCRIPTION OF THE DRAWINGS

Reference is now made to FIG. 1 which shows a suitable apparatus for forming particulate collagen or other protein into a spongy rod which is suitable for use as a cigarette filter. As mentioned briefly above, the chilled homogenizing mixers 20 and 22, which may be batch mixers of the Hobart type and which are shown connected to the continuous feed hopper 24, receive both finely milled collagen particles and crystals of snow (frozen water crystals), frozen carbon dioxide crystals or similar crystalline material. Any suitable means of milling the collagen, such as for example is found in cowhide, may be employed, and one method is described in the above mentioned Eberly application. Of course any number of mixers can be used and two are shown as exemplary.

Techniques for producing snow crystals in many sizes from light and fine to large and heavy and varying in the liquid or gas phase volume with phase expansion factors of 500–1,000 percent are well known. Further, by maintaining proper temperatures and conditions during the processing, a two phase arrangement can be produced, having both solid crystal and liquid portions. Thus, a variety of quite different crystalline forms can be used in the mixture fed into the batch mixers 20 and 22 depending upon the exact properties of the filter sponge mass desired as output. The ratio of crystals to particles likewise partially determines the filter's properties and particularly the bulk density. Gelatin may also be added to the water or other liquid or gas before the crystals are formed to assist in entwining the particles.

The mixture is then chopped and mixed at temperatures below the phasing point in mixers 20 and 22 with some entwining being achieved by partial liquification of the crystals under the forces of blade shear and turbulence. After the desired entwining and selected bulk density have been achieved by the mixture in the two mixers 20 and 22, the combination is fed into the hopper 24, either manually at discrete intervals or continuously via tubes 26 and 28, as shown in the FIG. 1.

The continuous feed hopper 24 simply holds the mixture at a temperature which is low enough to prevent the melting and consequent destruction of the crystals previously added, and the mixture in hopper 24 is continually removed from the bottom thereof by a variable speed worm compacter 30 as shown, and forced into a roughly U-shaped forming tube 34 which has a gradually decreasing internal diameter so as to compact the mixture continually forced through the tube by worm compacter 30. Coils carrying chilled liquids may be mounted adjacent to or about worm compacter 30 to prevent melting and premature collapse of the matrix in the compacter 30.

This forming tube 34, which is preferably lined with Teflon or similar low friction material, has porous walls through which the crystal matrix is constantly drawn into a surrounding vacuum chamber 38 maintained at a low pressure by pump 56. A trap or drain 40 is mounted in the bottom of chamber 38 to eliminate the matrix removed from tube 34. The rate at which the supporting crystal matrix is removed from the forming tube 34 is, of course, controlled by varying the pressure maintained in chamber 38 by pump 56 and the relative humidity of the air entering tube 34 from cut-off station 54, as well as the amount and type of crystals comprising the matrix.

The forming tube 34 thus serves to convert a loose combination of collagen particles and snow having, for example, an original diameter of 3 to 4 inches into a solid but spongy rod with a diameter of, for example, 8 mm. and having a tight, dense wall.

The output rod 52 will then preferably be a size suitable for use as cigarette filters, for example, about 8 mm. and will continually emerge from the forming tube 34 and move to the cut-off and conveyor station 54 where the rod is cut into cigarette filters of the desired length. The pump 56 and air conditioner 58 also supply an air input at a controlled humidity to tube 34 to remove vapor and other volatiles so that the emerging rod has an acceptable moisture content. If desired, surface finishing of the rod wall can also be undertaken after the rod emerges from tube 34.

By the method and apparatus described above, a spongy, solid mass of particulate protein can be produced without the expense and difficulty of removing water from a slurry. Moreover, the above method and apparatus can produce the mass in a variety of shapes, sizes and properties, including thin flat sheets. The method and apparatus is not, of course, limited to any particular crystal matrix, although both snow and frozen carbon dioxide have been shown to be satisfactory. The above description is intended to set forth one example of the invention and many changes and modifications are possible without departing from the spirit and scope of the invention.

What is claimed is:

1. A method of producing a spongy mass of collagen particles comprising the steps of:
   mixing collagen particles with crystals of frozen material chosen from the group consisting of ice, snow and frozen carbon dioxide,
   compacting said particles and said crystals including the step of forcing said mixture through a porous tube having a decreasing internal diameter, and
   removing said crystals from the mixture so as to leave a spongy mass of collagen particles including applying a reduced pressure to a chamber surrounding said tube so that the crystals are converted into their gaseous phase.

2. A method as in claim 1 wherein said compacting includes a further step of feeding said mixture through a worm compacter before said mixture is forced through said porous tube.

3. A method as in claim 1 wherein said collagen in said tube is moist and including the step of feeding air into said tube to dry said spongy mass.

4. A method as in claim 1 wherein said crystals are frozen carbon dioxide.

5. A method as in claim 1 wherein said crystals are snow.

6. A method as in claim 1 including the step of milling the collagen into fine particles prior to mixing them with the frozen material.

7. A method as in claim 1 wherein said mixing step includes the step of mixing and chopping said particles and crystals in a Hobart mixer.

8. A method of forming a mass of collagen particles comprising the steps of:
   mixing protein particles with crystals of frozen material chosen from the group consisting of ice, snow and frozen carbon dioxide, and
   removing said crystals from the mixture by applying a reduced pressure to the region about said mixture so that said crystals are converted into their gaseous phase, leaving said mass of protein particles.

9. A method of producing a cigarette filter comprised of particles of collagen comprising the steps of:
   milling collagen into fine particles,
   mixing said particles with crystals of a frozen material chosen from the group consisting of ice, snow and frozen carbon dioxide,
   forcing said mixture through a porous tube having a decreasing diameter, and
   removing said crystals from said tube by applying a reduced pressure to the region about said mixture so that said crystals are converted into their gaseous phase and so that a solid rod comprised of said particles emerges from said tube.

* * * * *